United States Patent [19]

Genusov et al.

[11] Patent Number: 5,053,987
[45] Date of Patent: Oct. 1, 1991

[54] ARITHMETIC UNIT IN A VECTOR SIGNAL PROCESSOR USING PIPELINED COMPUTATIONAL BLOCKS

[75] Inventors: Alexander Genusov; Ram B. Friedlander, both of Haifa, Israel; Peter Feldman, Pittsburgh, Pa.; Vlad Fruchter, Haifa, Israel

[73] Assignee: Zoran Corporation, Santa Clara, Calif.

[21] Appl. No.: 430,815

[22] Filed: Nov. 2, 1989

[51] Int. Cl.$^5$ .............................................. G06F 7/38
[52] U.S. Cl. .................................... 364/736; 364/748
[58] Field of Search ....................... 364/736, 748, 768

[56] References Cited

U.S. PATENT DOCUMENTS

| | | | |
|---|---|---|---|
| 3,900,723 | 8/1975 | Bethany et al. | 364/736 |
| 4,665,479 | 5/1987 | Oinaga | 364/736 |
| 4,766,564 | 8/1988 | De Groot | 364/748 |
| 4,777,592 | 10/1988 | Yano | 364/736 |
| 4,901,267 | 2/1990 | Birman et al. | 364/748 |
| 4,916,651 | 4/1990 | Gill et al. | 364/736 |

*Primary Examiner*—Dale M. Shaw
*Attorney, Agent, or Firm*—Henry K. Woodward

[57] ABSTRACT

An arithmetic unit for a vector signal processor implements IEEE Standard 754 for Floating-Point Arithmetic. The arithmetic unit includes three pipelined floating-point computational blocks: a multiplier, an adder-subtracter, and an adder to provide for high computation throughput for digital signal processing (DSP) operations. The adder-subtracter and the adder have the same input operands, so that the sum and difference of these input operands can be computed simultaneously. A first and a second internal data bus are provided for transferring data and instructions within the arithmetic execution unit. The input/output operands and partial results are stored in a set of auxiliary registers. Most of these registers can be organized in pairs that for complex arithmetic computations are used to store the real and the imaginary parts of a complex operand. A register-pair can also simultaneously handle two different real operands. The operands are fetched from an internal data buffer from, for example, sources internal to the integrated circuit such as internal RAM, ROM and arithmetic registers. Computation results from the Multiplier, the Adder, and the Adder-Subtracter are temporary stored in the auxiliary registers before writing to the internal RAM or arithmetic registers of the integrated circuit. Data-flow in the vector arithmetic unit is controlled by a vector control unit.

6 Claims, 16 Drawing Sheets

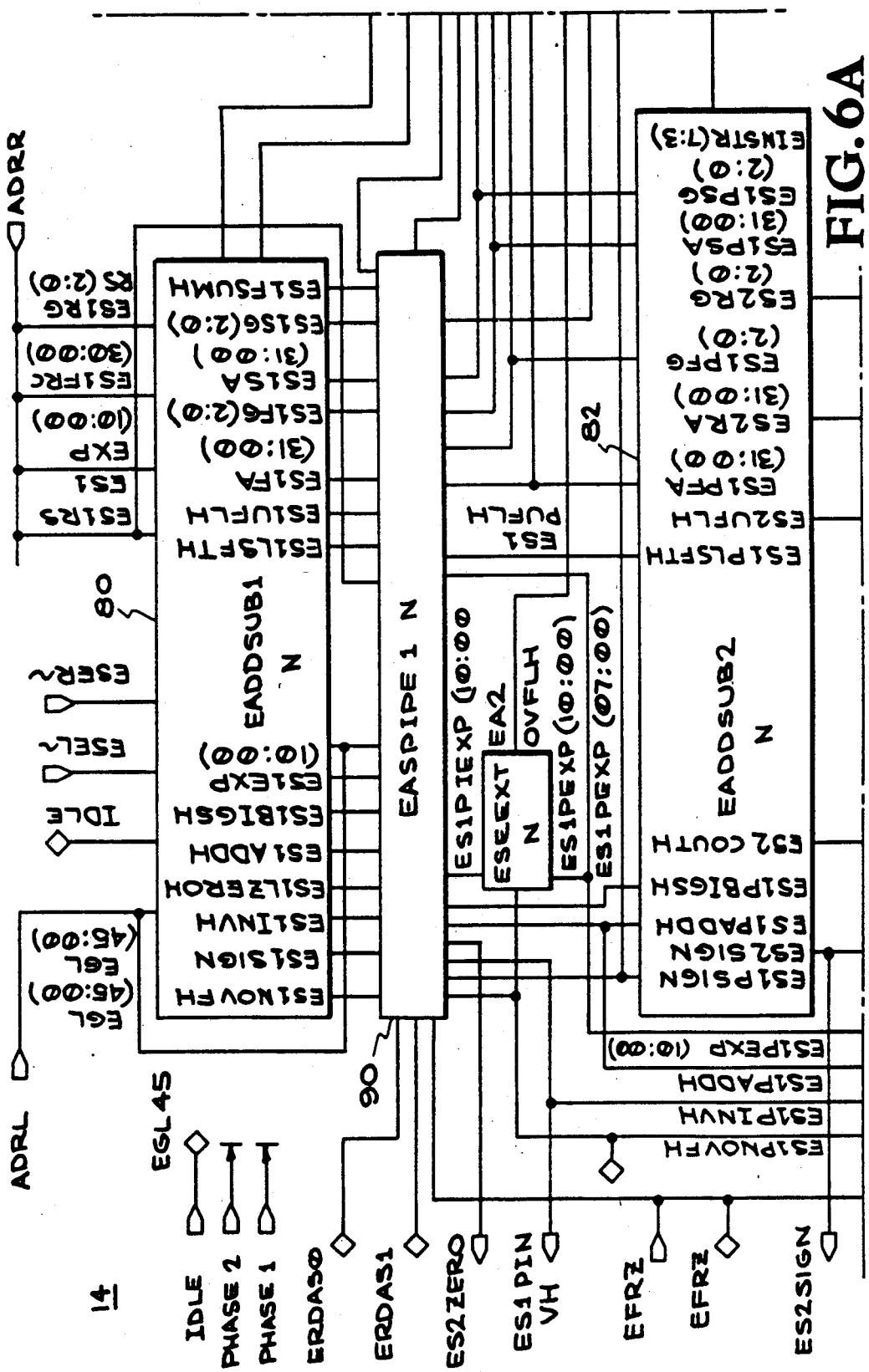

ARITHMETIC UNIT IN A VECTOR SIGNAL PROCESSOR USING PIPELINED COMPUTATIONAL BLOCKS

BACKGROUND OF THE INVENTION

1. Field of the Invention

This invention relates to high speed computing apparatus and more particularly to an arithmetic unit for a vector signal processor used for signal and image processing applications.

2. Prior Art

Signal processing algorithms operating with very large amounts of data require extremely high processing throughput. Some attempts have been made to design pipelined arithmetic units, mainly as special arithmetic components, or building blocks, like multipliers and special purpose ALUs. Only a few of these designs use a programmable processor architecture for signal and image processing that involve transform and filter operations.

Complex computations, which are common to digital signal processing, require wide dynamic range and high accuracy. Different techniques have been implemented to achieve these criteria, such as enlarged data word lengths (using 24 to 32 bits per word), block floating-point arithmetic, and floating-point arithmetic.

OBJECT OF THE INVENTION

It is an object of this invention to provide an arithmetic unit for a a vector signal processor which processes signal data in an improved manner.

It is another object of the invention to provide an arithmetic processor with a higher throughput.

It is another object of the invention to provide an arithmetic processor which supports a wider dynamic range of signal data.

It is another object of the invention to provide an arithmetic unit which has greater computation precision.

It is another object of the invention to provide an arithmetic unit which supports the 1985 IEEE Standard 754 for Floating Point Arithmetic.

It is another object of the invention to provide an arithmetic unit for a vector signal processor which supports optimal utilization of computation features and resources within the vector signal processor.

SUMMARY OF THE INVENTION

These and other objects, features and advantages of the invention are achieved by the vector arithmetic unit, optimized for signal processing, disclosed herein.

The arithmetic unit according to the invention is implemented within an integrated circuit to be produced by the Zoran Corporation of Santa Clara, Calif., the ZR34325 32-Bit IEEE Floating-Point Vector Signal Processor.

The arithmetic unit according to the invention implements IEEE Standard 754 for Floating-Point Arithmetic. The arithmetic operations Multiply, Add, Subtract and Compare are implemented in hardware according to the Standard requirements, including support for denormalized numbers. Divide, Remainder and Square Root operations, also required by the Standard, are implemented in software. All five exceptions and four rounding modes are supported. This vector arithmetic unit consequentl the first DSP-oriented arithmetic unit to fully implement IEEE Standard 754 for Floating-Point Arithmetic.

The vector arithmetic unit performs format conversion between 16- and 24- bit 2's complement integer and single format floating-point numbers. It also provides a special operations, SPLIT and JOIN, for separate treatment of mantissa and exponent of floating-point numbers.

The instructions executed in the vector arithmetic unit include the most useful DSP algorithms: FIR, IIR, DFT, FFT and other. The instructions for these algorithms are implemented by circuits embedded in the processor chip.

The vector arithmetic unit includes three floating-point computational blocks: Multiplier, Adder-Subtracter and Adder. To provide for high computation throughput for DSP operations, the computational blocks are arranged in a number of pipeline stages: three stages in the Multiplier and the Adder and four stages in the Adder-Subtracter. This emphasis on pipelined stages makes a very high throughput possible. The Adder-Subtracter and the Adder have the same input operands, so that the sum and difference of these input operands can be computed simultaneously. This feature provides improved throughput, for example, a FFT butterfly computation is made in four clock cycles.

The vector arithmetic execution unit, or execution unit, is especially adapted for pipelined operation of a vector signal processor. The arithmetic execution unit includes a first and a second internal data buses for transferring data and instructions within the arithmetic execution unit.

A pipelined floating-point multiplier, which is coupled to the first and the second internal data buses, is provided for multiplying two complex numbers together. The multiplier includes a plurality of multiplier stages and a plurality of pipeline register stages positioned between the multiplier stages for storing intermediate results of the multiplier stages.

In one embodiment of the invention, the multiplier includes three multiplier stages and two pipeline registers. In addition, a Y register is provided for storing a first complex floating-point input operand from the auxiliary register. A first multiplier stage has as input signals the output of the Y register and a second input operand. The first multiplier stage also includes means for operating on the sign, exponent, and mantissa of the input operands and for computing the sign of the final result.

The first multiplier stage includes means for detecting "exceptions" under the IEEE Standard including quiet NaN, plus or minus infinity, zero, and denormalized numbers. Also included are means for detecting if the operation is invalid and for setting corresponding flags; means for adding the exponents of said first and said second input operands; means for performing part of the multiplication of the unsigned mantissas of said first and of said second input operands by using a modified Booth algorithm with 3-bit encoding; and means for transforming the partial products from the Booth algorithm into a sum and a carry array.

The second multiplier stage includes means for completing the multiplication of the mantissas by adding together the sums and the carry arrays of the first multiplier stage. The second multiplier stage also includes means for determining the final exponent and number of shifts of the mantissa, left or right, as a function of the exponent computed in the first multiplier stage and the number of leading zeroes in the mantissa.

The third multiplier stage includes means for shifting the mantissa right or left according to the number of shifts computed in the second multiplier stage. The second multiplier stage also includes means for incrementing the mantissa and the exponent, if necessary, and means for detecting overflow, underflow, and an inexact result.

A pipelined adder-subtracter, which is coupled to the first and the second internal data buses, is provided and includes a plurality of adder-subtracter stages and a plurality of pipeline registers located between said adder-subtracter stages for storing intermediate results of the adder-subtracter units.

In a particular embodiment of the invention, the floating-point adder-subtracter means includes a first adder-subtracter stage includes means for preparing input operands for a predetermined arithmetic operation; means for determining the predetermined arithmetic operation to be carried out on said input operands; and means for detecting and flagging exceptions to a predetermined arithmetic standard. A second adder-subtracter stage includes means for carrying out the predetermined arithmetic operation on said input operands and means for determining the sign of the result of said predetermined arithmetic operation. A third adder-subtracter stage includes means for normalizing the output of the second adder-subtracter to the predetermined arithmetic standard. A fourth adder-subtracter stage includes means for rounding an extended-format result of the third adder-subtracter into a standard floating-point number and means for flagging overflow and for generating a standard result in response thereto.

The execution unit includes a pipelined floating-point adder for adding two operands. The adder has its input connected to the output of the first pipeline register of the floating-point adder-subtracter. The pipelined floating-point adder includes a first adder stage which has means for converting the exponent and the mantissa of the input operands to a standard form, for example, a 32 bit format and means for carrying out an addition operation on the input operands. A second adder stage includes means for normalizing the output of the first adder stage to the predetermined arithmetic standard. A third adder stage includes means for rounding an extended format result of the second adder stage into a standard floating-point number and means for flagging overflow and for generating a standard result in response thereto.

The arrangement in which the adder receives its inputs from the first stage of the adder-subtracter permits simultaneous computation of sum and difference signals for the input operands.

The input/output operands and partial results are stored in a set of auxiliary registers. Most of these registers can be organized in pairs that for complex arithmetic computations are used to store the real and the imaginary parts of a complex operand. A register-pair can also simultaneously handle two different real operands. The operands are fetched from an internal data buffer from, for example, sources internal to the integrated circuit such as internal RAM, ROM and arithmetic registers. Computation results from the Multiplier, the Adder, and the Adder-Subtracter are temporary stored in auxiliary registers before writing to the internal RAM or arithmetic registers of the integrated circuit.

Data-flow in the vector arithmetic unit is controlled by a vector control unit. In the first phase of instruction execution, the control unit initializes the pipelines and selectively activates control circuit to orderly fill the pipes. The next phase is the steady-state in which arithmetic operations are performed. In the final phase of every instruction, the partial results that are flowing through the pipes are combined into the final result.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 6A-6C are a block diagram of a pipelined floating-point adder-subtracter. This figure also shows a block diagram for a pipelined floating-point adder which uses the first stage of the adder-subtracter, from which it receives its inputs.

FIGS. 12 and 13 are block diagrams of the third and fourth stages of the adder.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
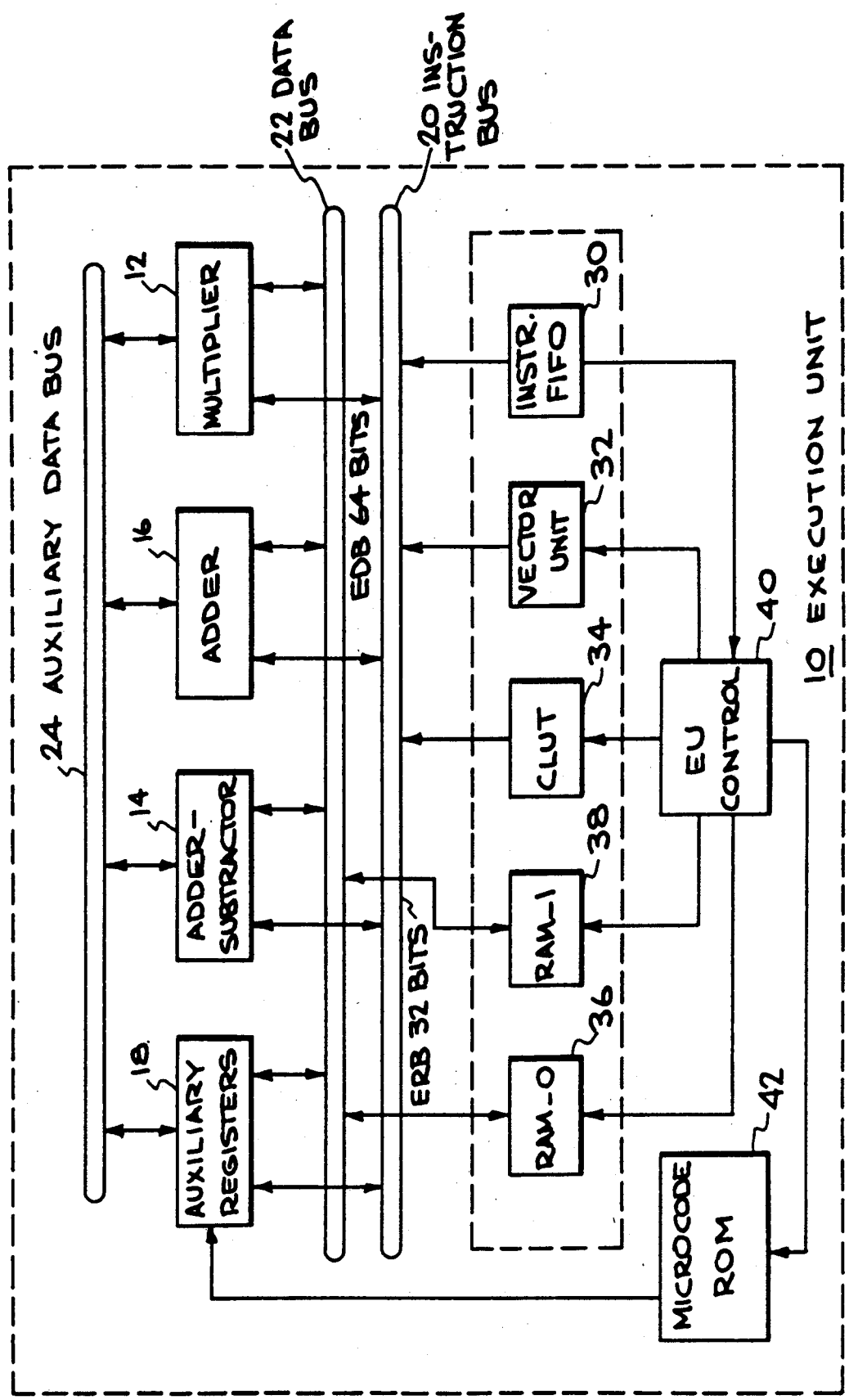
FIG. 1 is a block diagram of a vector arithmetic unit according to the invention.

FIG. 1 illustrates an embodiment of vector arithmetic unit 10, which is part of a vector signal processor, such as the Zoran ZR34325. The vector arithmetic unit includes a pipelined floating-point multiplier 12, a pipelined floating-point adder-subtracter 14, and a pipelined floating-point adder 16. Auxiliary registers 18 are coupled to the floating-point arithmetic units 12,14,16 with an auxiliary data bus 24. A first data bus 20 and a second data bus 22 are provided for transferring data and instructions between the execution unit 10 and external memory units including an instruction FIFO 30, a vector unit 32 for buffering external operands, a coefficient lookup table CLUT 34 for storing complex sine and cosine value coefficients, and two internal random access memories RAM_0 and RAM_1. An execution unit control means 40 is provided for controlling dataflow in the execution unit. The control 40 receives instructions from the instruction FIFO 30 for control of the vector unit 32, the CLUT/34, the two RAMs 36,38 and for a microcode ROM 42, which has its output data fed to the auxiliary registers 18.

The floating-point multiplier 12 implements multiplication of two 32-bit floating-point numbers in single-precision format according to the 1985 IEEE Standard 754 for Binary Floating Point Arithmetic. The result is a 32-bit floating-point number in IEEE single-precision format. Simultaneously, four IEEE exception flags are updated for overflow, underflow, inexact result and invalid operation.

STRUCTURE OF THE MULTIPLIER

Figure 2:
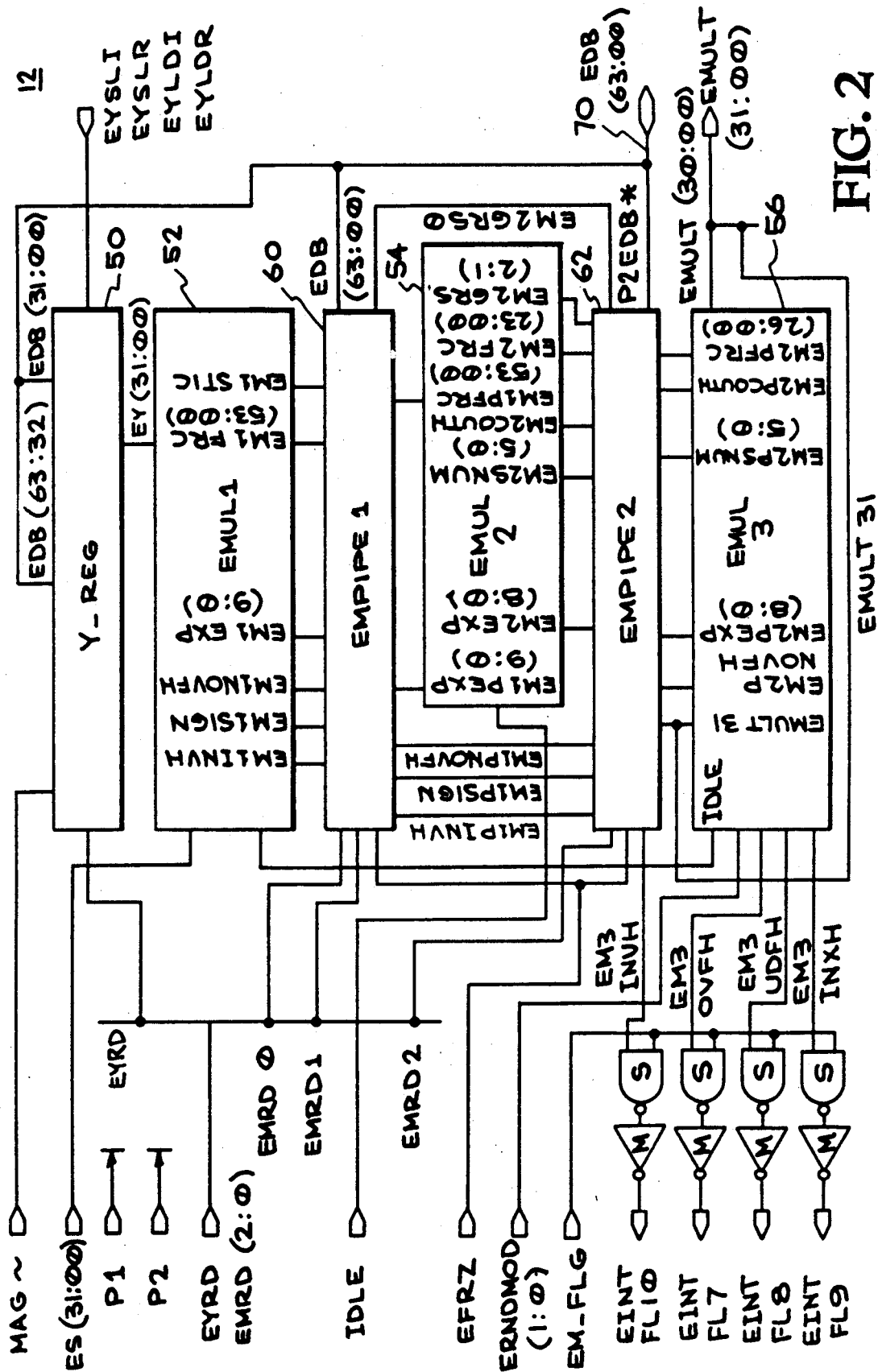
FIG. 2 is a block diagram of a pipelined floating-point multiplier, showing the Y register, the pipeline registers, and three multiplier stages.

FIG. 2 shows the multiplier 12 (EMUL) having a Y-register 50 (Y-REG) and three pipelined multiplier stages 52 (EMUL1), 54 (EMUL2), and 56 (EMUL3), separated by 2 pipeline registers 60 (EMPIPE1), 62 (EMPIPE2).

The Y-register 50 is 64 bits wide and is used to store a complex floating point number. It may be loaded from the most significant or the least significant half of the complex data bus 70 by the signals EYSLR and EYSLI. The real or the imaginary half may be selected for multiplication or read to the complex data 70 bus for testing in a freeze mode.

Figure 3:
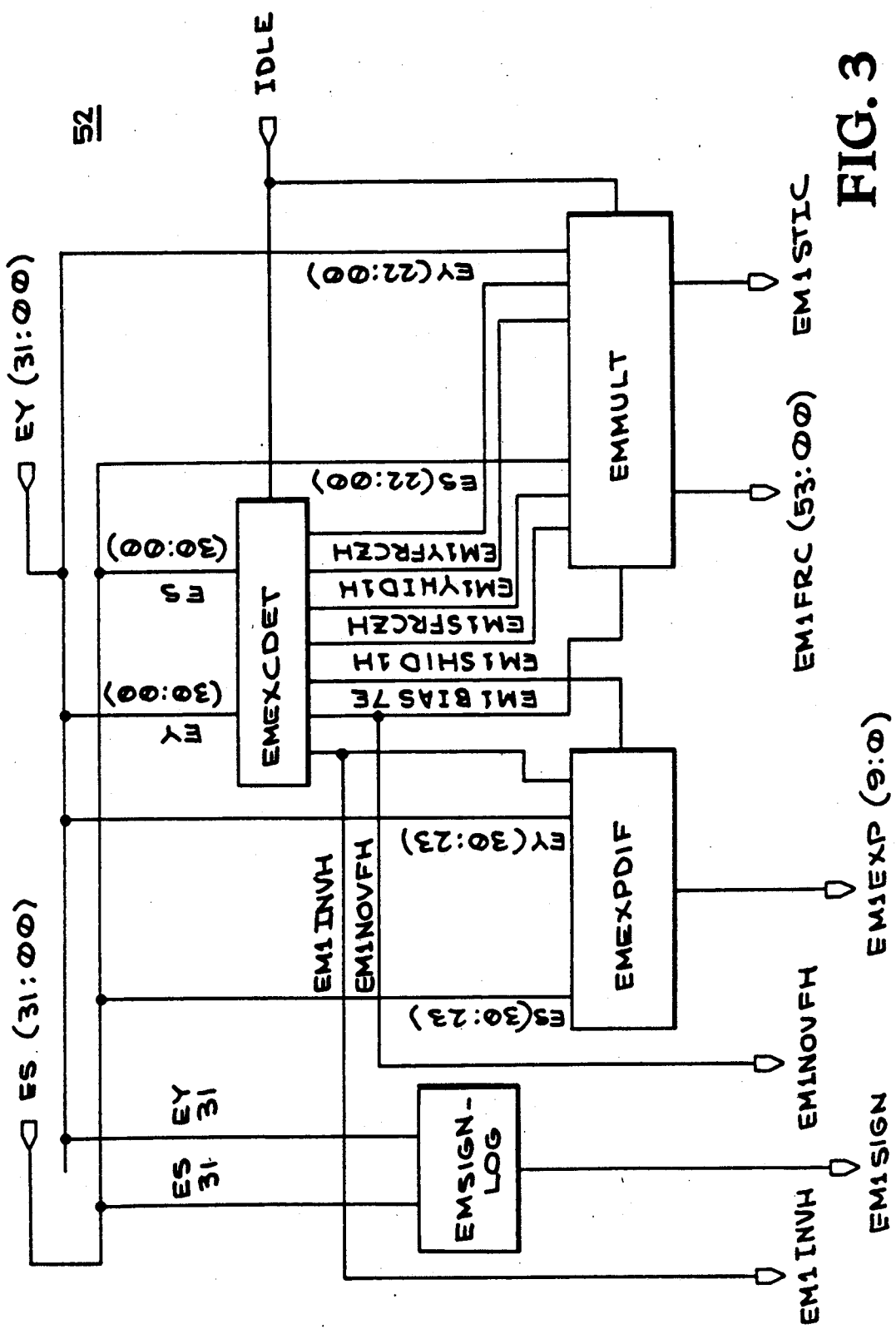
FIGS. 3, 4, and 5 detailed block diagrams of the elements of the respective three stages of the multiplier.

FIG. 3 shows the details of the first stage of the multiplier 52 (EMUL1). This stage 52 includes an execution unit multiplier sing logic (EMSIGNLOG) which operates on the sign, exponent and mantissa to compute the sign of the result. An execution unit multiplier exception detector (EMEXCDET) detects all of the exceptions specified by the IEEE 754 Standard: quiet or signaling NaN (not a number); plus or minus infinity; zero; and denormalized numbers. The unit also detects if the operation requested is invalid and sets a corresponding flag. An execution unit multiplier exponent difference unit (EMEXPDIF) also adds the exponents of the two input operands, taking into consideration their bias, to obtain their biased sum.

If as a consequence of an exception the result has to be infinite or NaN, the exponent is forced to an appropriate value and the further stages are signaled that, such an exception occurred.

At this stage, the exponent result may be greater than 8 bits or negative because, as a result of normalization, the exponent may be brought back in the allowed 8-bit range. An execution unit multiplier fraction multiplier (EMMULT) performs a part of the multiplication of the two unsigned 24 bit mantissas, using a modified Booth algorithm with 3-bit encoding. This stage transforms the 8 partial products into a sum and a carry array. The four signals that come from the exception detector may force a 0 or a 1 into either of the operands Another signal forces a 1.00 . . . 1 into one of the operands to obtain the quiet NaN as a result.

Figure 4:
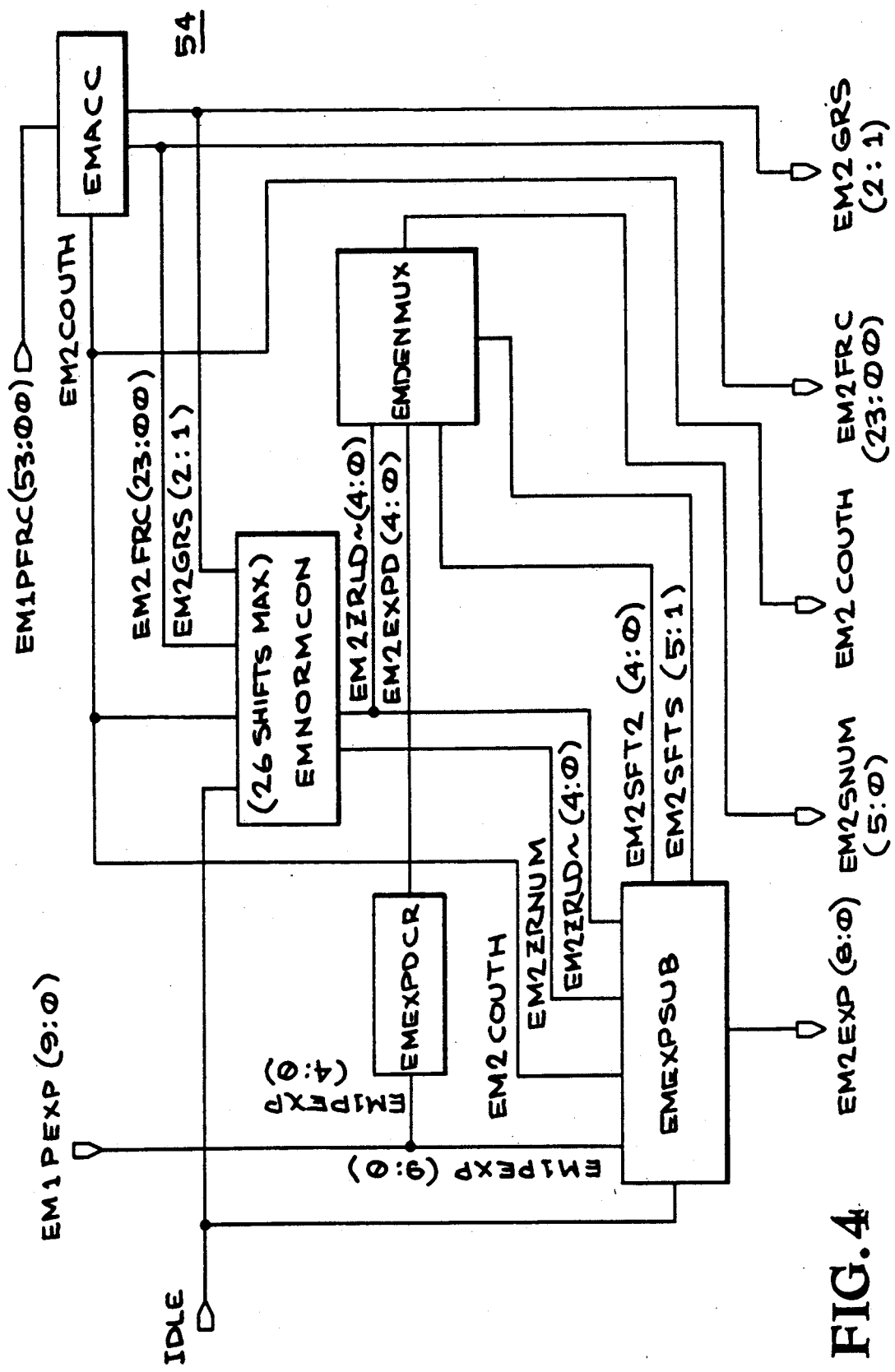

FIG. 4 shows the details of the second stage 54 of the multiplier, EMUL2. This stage includes an execution unit multiplier accumulator unit (EMACC) which completes the multiplication of the mantissas by adding together the sum and the carry arrays obtained in the previous multiplier stage 52. This stage 54 includes an execution unit multiplier normalization control unit (EMNORMCON), an execution unit multiplier exponent subtractor unit (EMEXPSUB), and an execution unit multiplier exponent decrementer unit (EMEXPDCR), and an execution unit multiplier exponent multiplexer unit (EMDENMUX) which collectively determine the final exponent value and the number of shifts of the mantissa, left or right, as a function of the value of the exponent computed in the first stage 52 and the number of leading zeroes in the mantissa.

Figure 5:
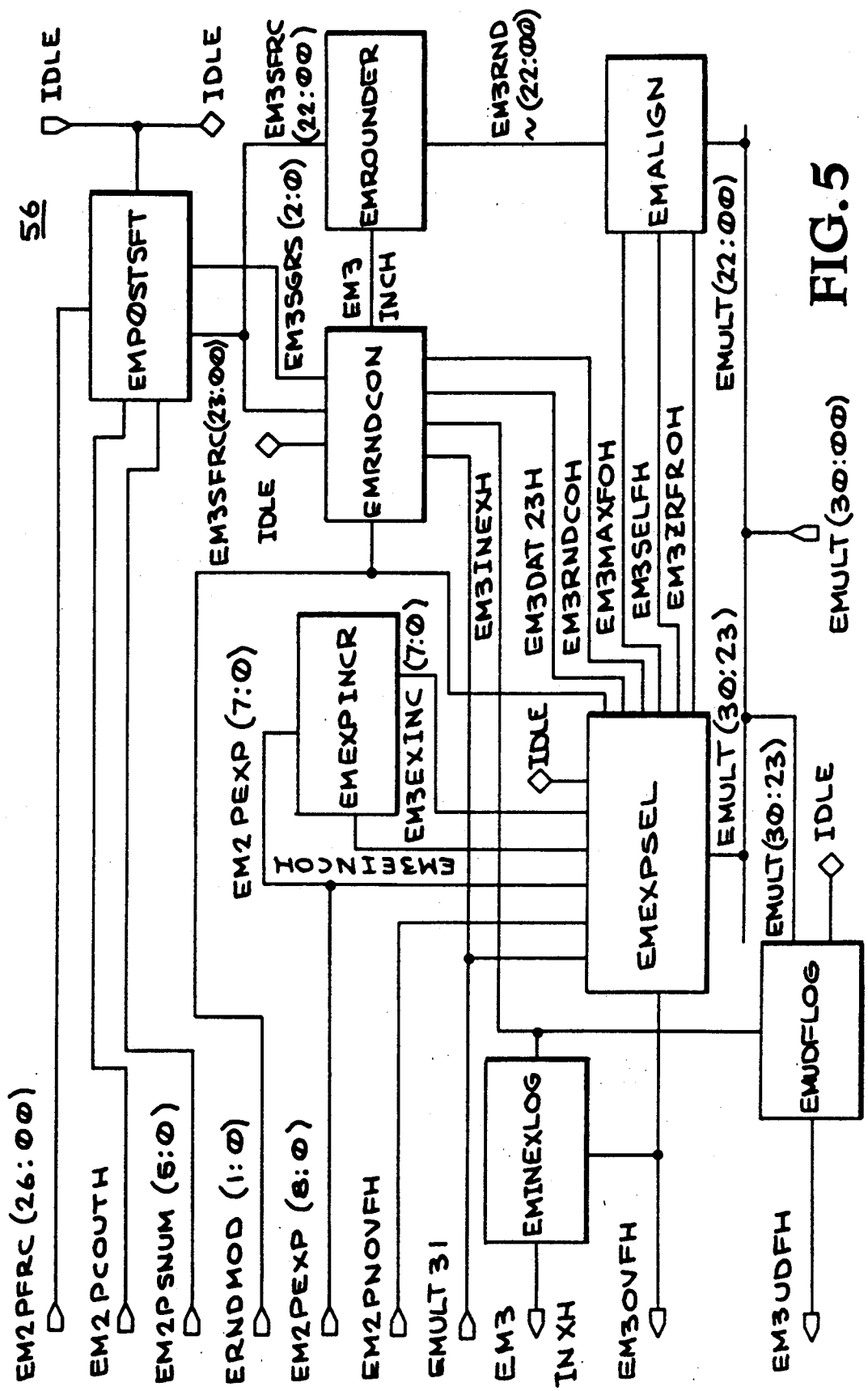

FIG. 5 shows the details of the third stage 56 of the multiplier, EMUL3. This stage includes an execution unit multiplier post shifter unit (EMPOSTSHFT) which shifts the mantissa right or left according to the number of shifts computed in the previous stage 54. This stage further includes an execution unit multiplier rounding control unit (EMRNDCON), an execution unit rounding unit multiplier rounding unit (EMROUNDER), execution unit multiplier aligner (EMALIGN) which collectively increment the mantissa, if it is necessary, according to the rounding mode. This stage includes an execution unit multiplier exponent incrementer (EMEXPINCR) and an execution unit multiplier exponent selector (EMEXPSEL) which increment the exponent if an overflow resulted in the mantissa being incremented. This stage also an execution unit multiplier inexact logic unit (EMINEXLOG) and an execution unit multiplier under flow output unit (EMUDFLOG) which detect overflow, underflow and an inexact result.

Two pipeline registers 60,62 separate the three stages of the multiplier and store partial results. When the vector arithmetic unit is frozen in the freeze mode, the contents of the pipeline registers 60,62 may be read to the complex data bus 70.

STRUCTURE OF THE ADDER-SUBTRACTER

Figure 6B:
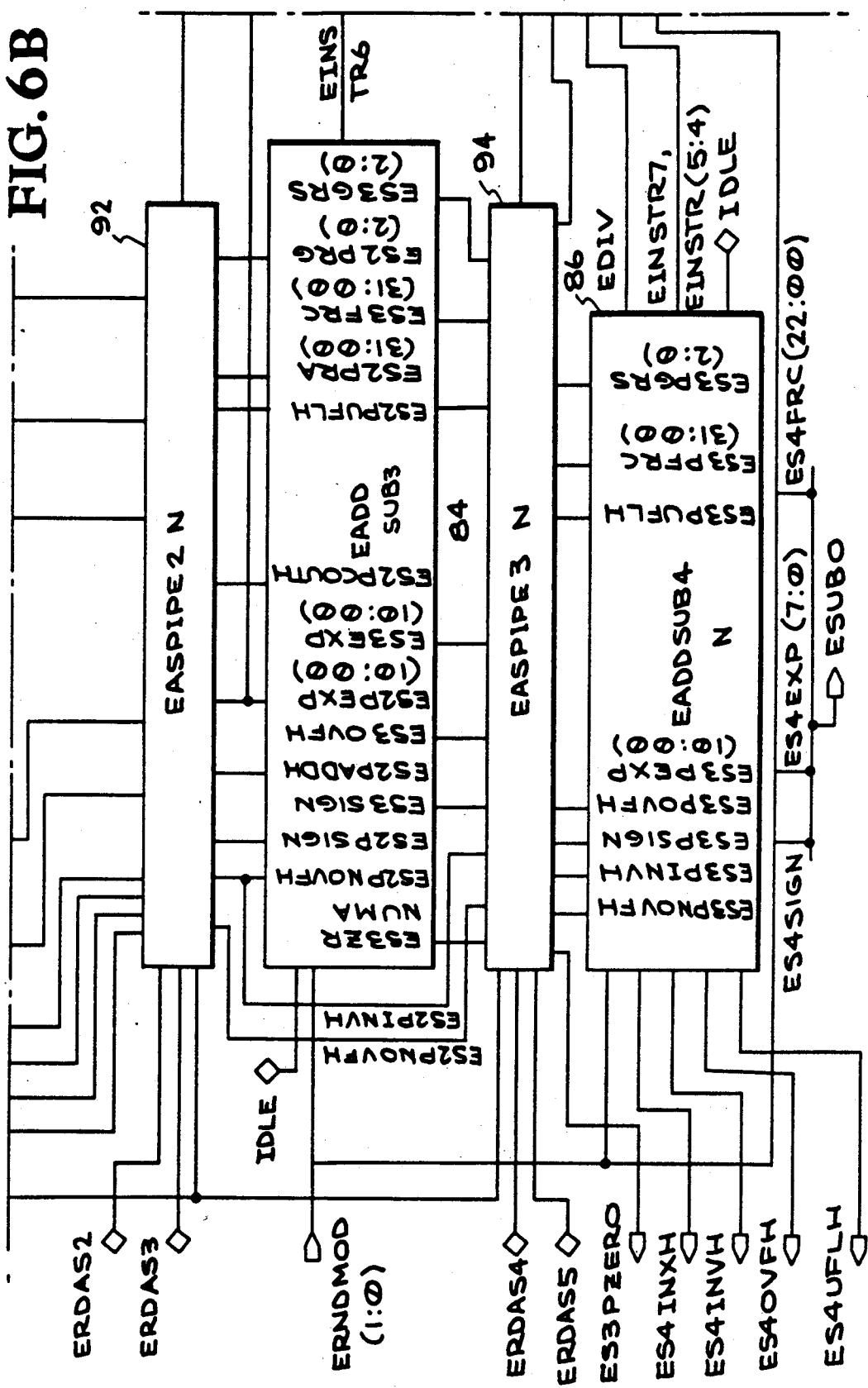
Figure 6C:
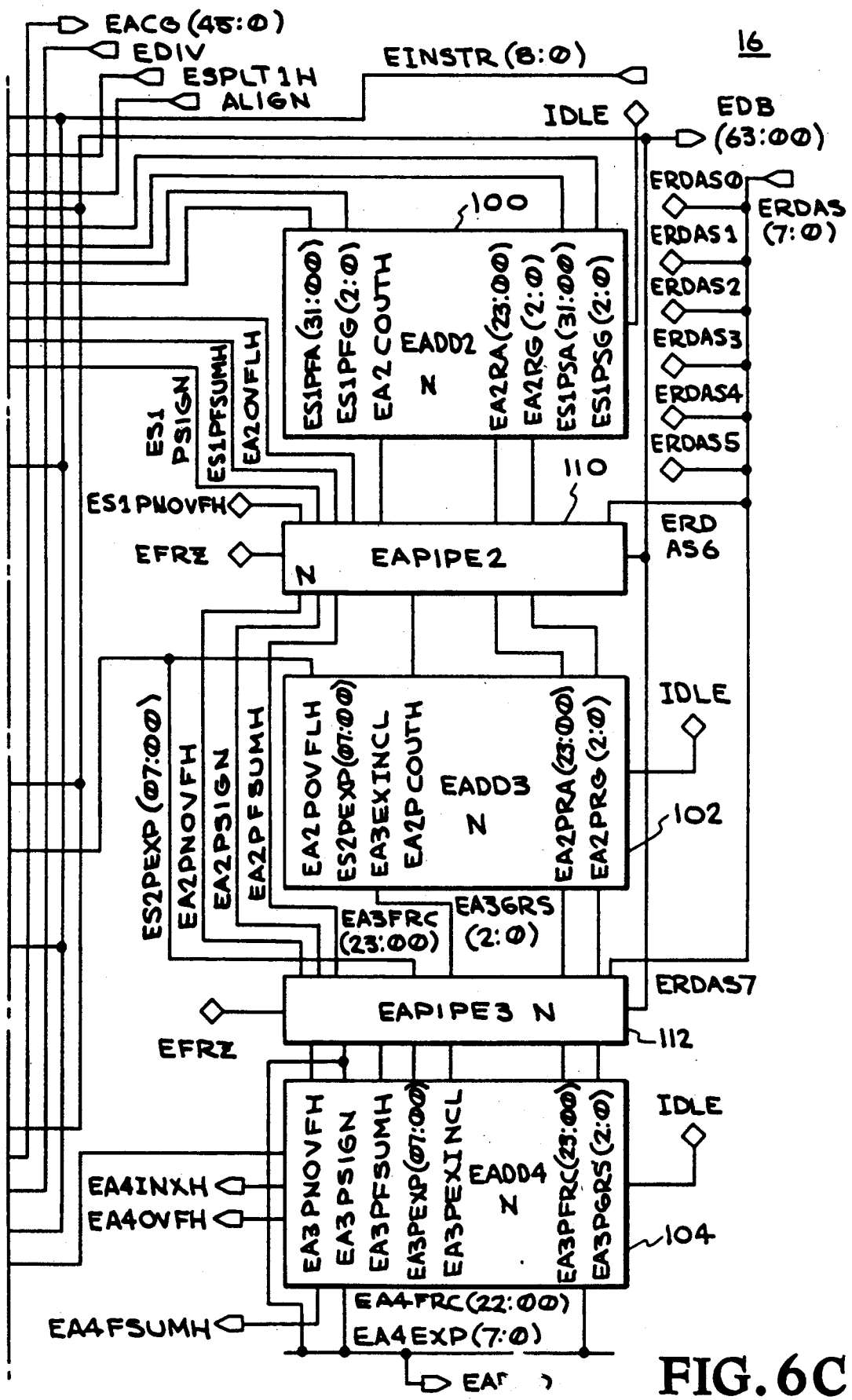

FIG. 6 shows a general purpose adder-subtracter 14, which performs addition and subtraction on extended format (45-bit) floating-point numbers. The adder-subtracter 14 includes four adder-subtracter stages 80,82,84,86 separated by three pipeline register 90,92,94.

In addition to the general purpose adder-subtracter 14, FIG. 6 shows a supplementary adder 16 which includes three adder stages 100,102,104 separated by two pipeline registers 110,112.

Having both the adder-subtracter 14 and the adder 16 enables a processor to simultaneously compute both the sum and the difference of two operands. This feature greatly speeds up FFT types of instructions. The extended format increases the precision of the result when accumulation is performed. The ADDER word length is 32 bits, the same as that of the second output of ADDER-SUB, after rounding.

The adder-subtracter 14 performs the arithmetic needed for comparison type instructions and implements integer-to-float, float-to-integer format conversions, the split and join instructions and operand alignment (useful in LUT instruction). The unit conforms to 1985 IEEE 754 Standard for Binary Floating-point Arithmetic for add, subtract, and compare.

Figure 7:
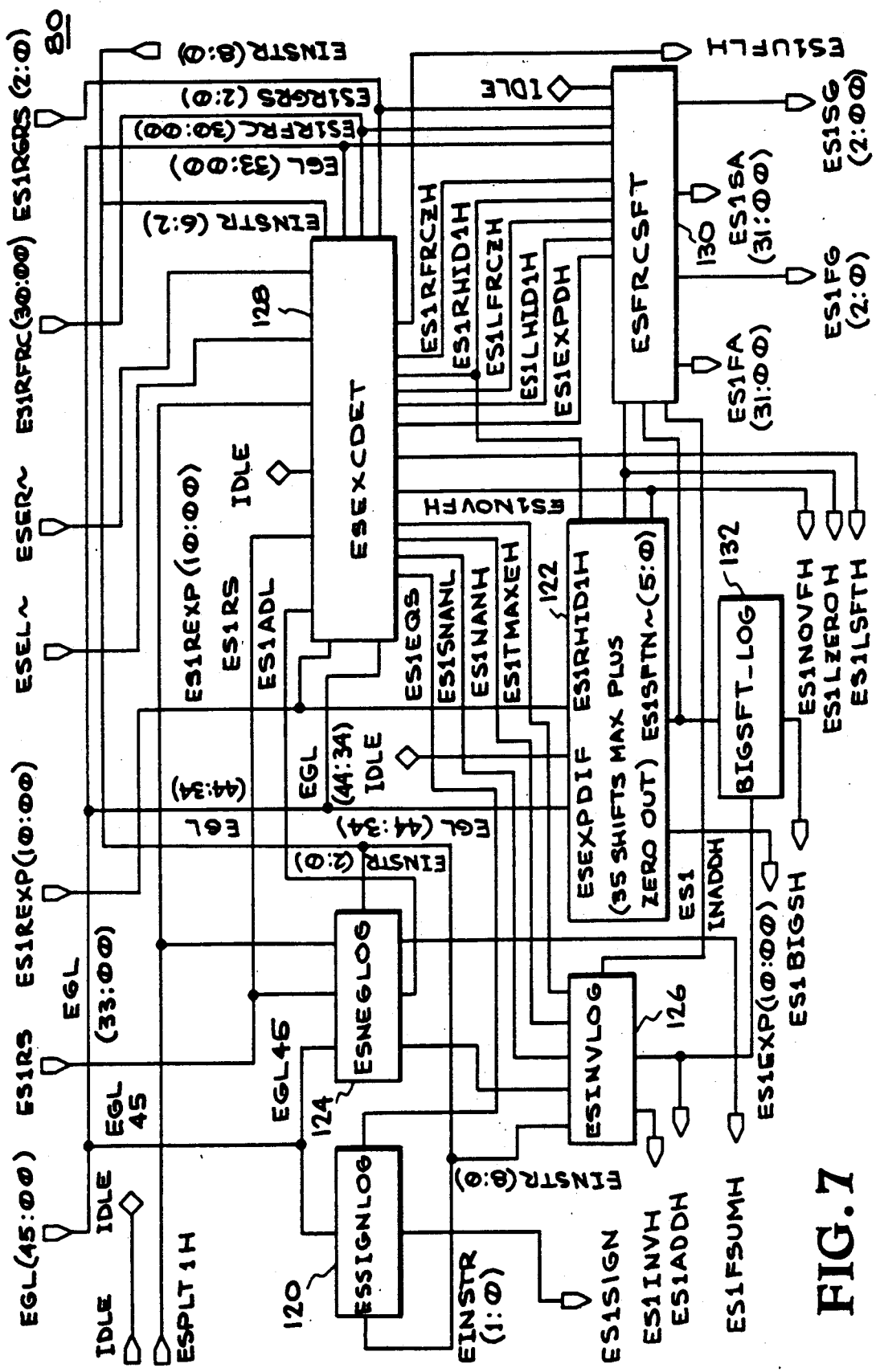
FIGS. 7, 8, 9, and 10 are more detailed block diagrams of the ,elements of the respective four stages of the first stage of the adder-subtracter.

FIG. 7 shows a block diagram of the first stage 80 of the adder-subtracter (EADDSUB1). In this stage, the operands are prepared for the add/subtract operation by appropriate bit alignment. The particular arithmetical operation to be carried out in stage 2 is determined. At the same time, the circuit detects and flags the possible exceptions and, if required, generates a standard result.

In the ESSIGNLOG block 120, the sign is computed as a function of the selected operation (add/subtract) and the sign of the left-operand. (The final sign is decided after subtraction in the second adder-subtracter stage 82.) For COMPARISON instruction, if the operands are equal, the sign is made positive.

The ESEXPDIF block 122 checks which of the two operands has a greater exponent by subtracting the exponents and testing the carry-out. The greater exponent is outputted to the next stage 82. The direct and inverse differences are simultaneously computed (EXPSUB) and the correct one (equal to the number of shifts required to align the fractions) is selected for use in the SHIFTER logarithmic shifter of six stages. If the exponents differ by more than 63, a fixed number (56) is generated.

The ESNEGLOG block 124 makes the decision whether the second stage 82 will do ADD or SUBTRACT, as function of the sign of the operand and the type of instruction. In the case of FFT instruction, the signal ES1FSUMH is activated to show when the algebraic sum is outputted by either the adder-subtracter ("1") or by the adder ("0").

The ES1NVLOG block 126 detects whether the operands are invalid for the current instruction and activates the flag ES1INVH. If a standard result must be generated for NaN (Not-A-Number), the signal ES-1INADDH is activated also. Invalid operations are: subtraction of infinities; NaN if floating-point-to-integer, compare, split, or join; and SNaN.

The ESEXCDET block 128 detects special operand values and generates corresponding signals as follows: at least one NAN generates ES1NANH; only one INFINITE generates ES1INNINH; both INFINITE generates ES1TMAXEH; infinite or NAN generates ES1NOVFH; and equality (comparison of infinities) generates ES1EQL. This block, as a function of the operation type, determines if a hidden-one must be generated (ES1LHID1H, ES1RHID1H) or if a fraction has to be nulled (ES1LFRCZH, ES1RFRCZH).

The ESFRCSFT block 130 zeroes the fraction (if requested by the EXCEPTION detector) or generates NAN. It chooses the left or right operand for shifting, makes the necessary correction when one of the operands is DEN and shifts the fraction.

The BIGSFT-LOG block 132 tests whether an operand is shifted into the sticky bit and activates ES1-BIGSH used in the second adder-subtracter stage 82 to make a correction (as required by the IEEE Standard).

Figure 8:
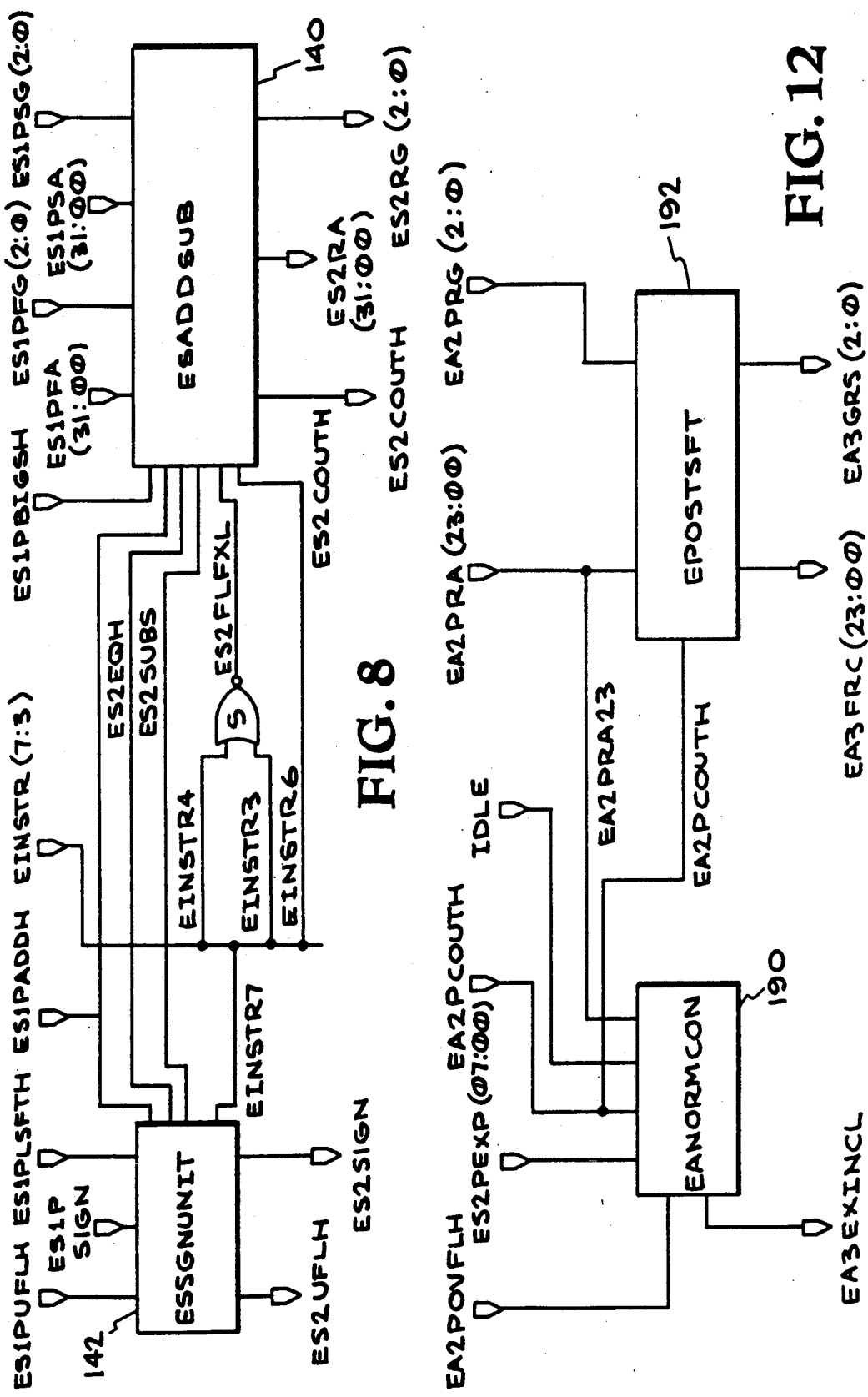

FIG. 8 shows a block diagram of the second stage 82 of the adder-subtracter (EADDSUB2). In this stage the specified operation is carried out and the sign of the result is decided. The output of this stage is the (not normalized) sum or the positive difference of the two operands. In the case of floating-to-fixed-point/fixed-to-floating-point instructions, the output is the negative difference. For a JOIN instruction, underflow is flagged (ES2UFLH).

The ESADDSUB block 140 computes the sum or difference of the two operands and selects the positive result (if ES2FLFXL is active the 2's complement result is selected). If ES1PBIGSH is active, the sticky bit replaces the LSB of the shifted operand (correction for subtracting 2 numbers whose ratio is greater than 2**32).

The ESSGNUNIT block 142 determines the sign of the result (ES2SIGN) and flags underflow, if appropriate, for JOIN instruction.

Figure 9:
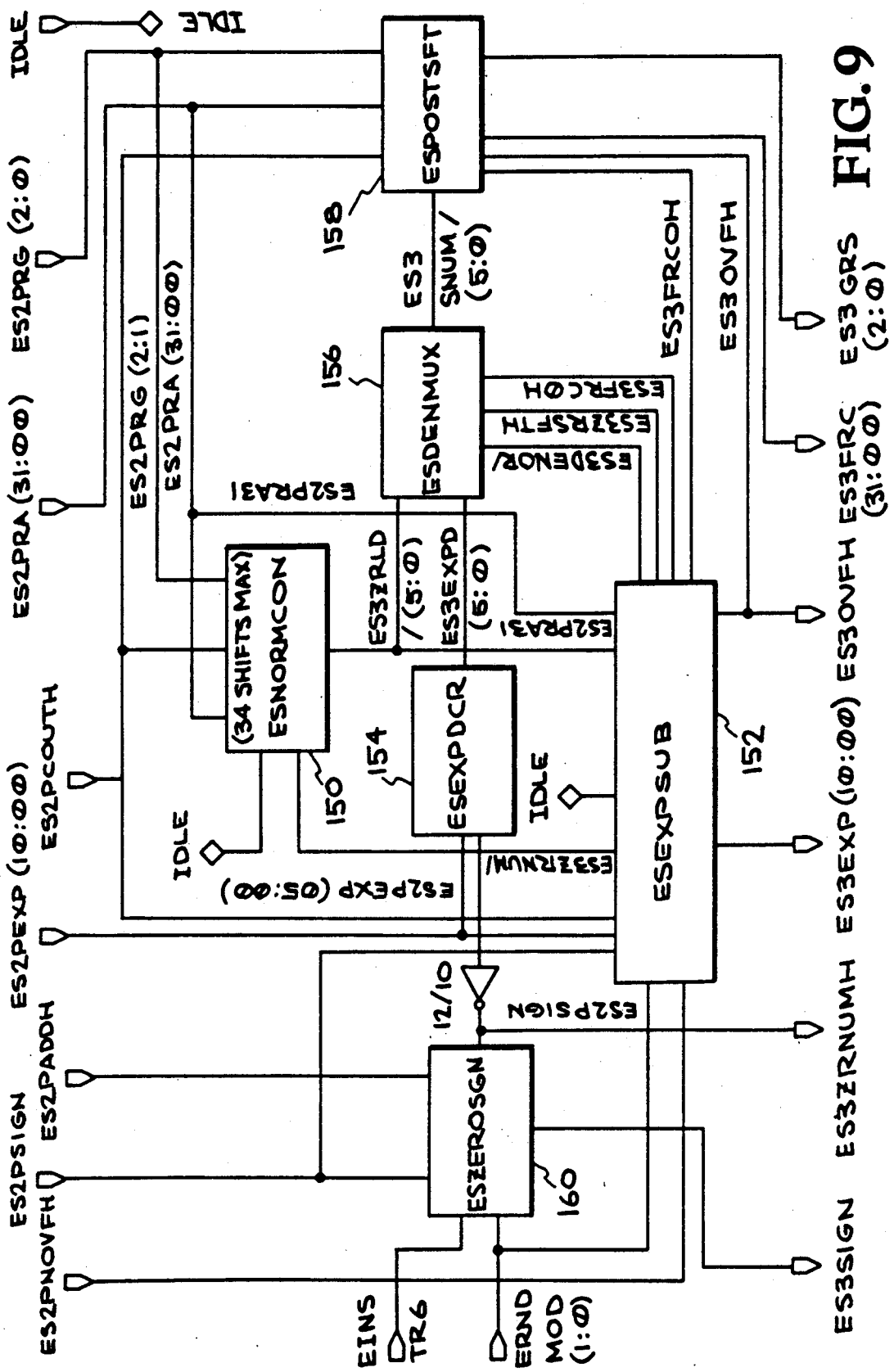

FIG. 9 shows a block diagram for the third stage of the adder-subtracter (EADDSUB3). In this stage the result is turned into a standard IEEE number by proper normalization. If the former stage generates a carry-out, the result is shifted to the left one position and the exponent is incremented. If there is no carry, if the exponent is not zero and the left most bit is not one, then the fraction is left-shifted a number of places equal to the leading zeroes and a correction is made to the expon.

If the number of leading zeroes is greater than or equal to the exponent, the number of shifts is (exponent-1) and the exponent is zeroed to show a denormalized result. If the exponent is zero and the left most fraction bit is 1, the result exponent is made 1 since the result is a normalized number. If the fraction is zero, a proper sign is generated for the result, as a function of the rounding mode.

The ESNORMCON block 150 detects the number of leading zeroes in the fraction, which is outputted as a binary number (ES3ZRLD), and if the fraction is all zeroes, as (ES3ZRNUMH).

The ESEXPSUB block 152 computes the correct exponent of the result, selects the number of shifts that must be performed (ES3ZRSFTH, ES3DENOR/), checks for overflow and, if appropriate, generates a standard overflow result (by activating ES3FRC1, ES3OVFH).

The ESEXPDCR block 154 is a exponent decrementer.

The ESDENMUX block 156 is a four-way multiplexer that selects the number of shifts (ES3SNUM): 1. ES3SNUM = number of leading zeroes; 2. ES3SNUM = exponent-1; 3. ES3SNUM = 48 (if ES3FRCOH = 1, the fraction is nulled by shifting in zeroes); ES3SNUM = 0 (otherwise).

The ESPOSTSHFT block 158 is a G-stage logarithmic shifter that shifts the fraction left 1 place (if ES2-PCOUTH = 1) or right 0 to 63 places. If the number of shifts is greater than 34, the fraction becomes zero and if ES3FRC1 = 1, it is made "all-ones".

The ESZEROSGN block 160 determines the sign of a "null" result (ES3ZRNUMH = 1) as a function of the rounding-mode.

Figure 10:
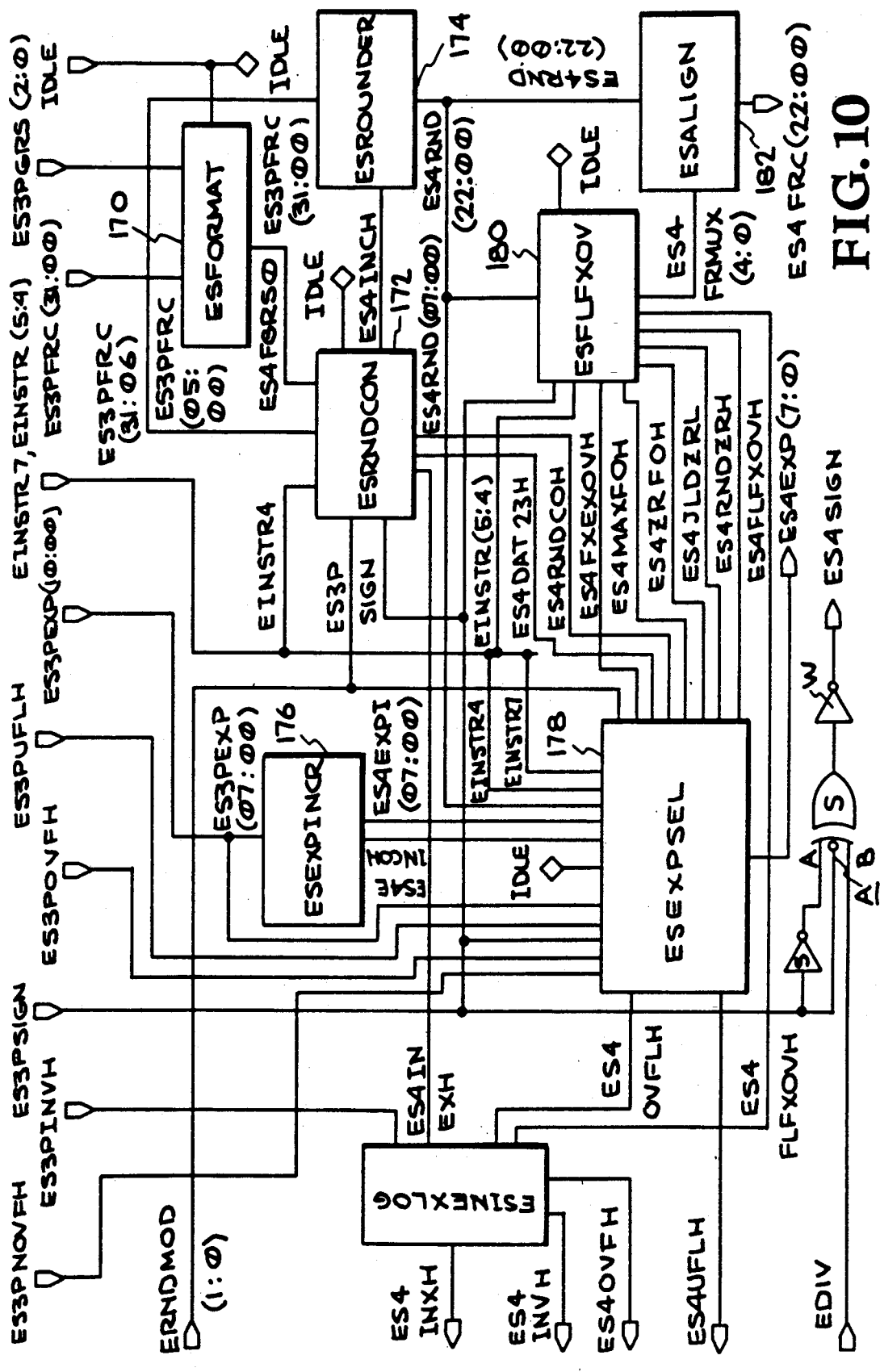

FIG. 10 shows a block diagram of the fourth stage 86 pf the adder-subtracter (EADDSUB4). This stage rounds the extended-format result into a standard 32-bit floating-point number. Overflow is flagged and a standard result is generated if necessary.

The ESFORMAT block 170 computes the new guard bits from the discarded ones (8).

The ESRNDCON block 172, depending on the rounding mode and fraction value, activates ES4INCH, which makes the ROUNDER increment the fraction. An additional circuit determines whether the CARRY from the incrementer will be 1. (ES4RNDCOH) and whether the most significant bit of the result will be 1 (ES4DAT23H).

The ESROUNDER block 174 is a conditional-sum incrementer.

The ESEXPINCR block 176 is an 8-bit incrementer.

The ESEXPSEL block 178 selects the exponent or exponent + 1 if there is carry from the ROUNDER 174 or if the MSB of the result is 1 and the exponent is 0, i.e., after rounding a normalized number is generated. For a SUM, DIFFERENCE instruction, overflow is detected and flagged and a standard result is generated, depending on the rounding mode. For a FLOATING-TO-FIXED POINT instruction, overflow is detected (exponent = 96H) and the sign is extended into the exponent bits. For a JOIN instruction, overflow and underflow (denormalized result) are detected and flagged and the exponent is made "all-one" or "zero", respectively.

The ESFLFXOV block 180 determines whether there is overflow, for the instruction FLOAT-TO-FIX. If this is true, the maximum positive (or negative) number is generated by properly activating ES4F-RMUX(4:0). The circuit activates ES4RNDZRH if the fraction is zero and ES4JLDZRL if it is <OxFF(H). If the fraction >=OxFF(H), overflow for JOIN).

The ESALIGN block 182 is a five-way multiplexer. Its output, as selected by ES4FRCMUX, can be: 1. ROUNDER output; 2. 7FFFFF(H) (overflow or max 24-bit positive number); 3. 000000 (overflow or max 24-bit negative number); 4. 007FFF(H) (max 16-bit positive number); 5. FF8000(H) (max 16-bit negative number).

STRUCTURE OF THE ADDER

FIG. 6 shows the adder 16, which includes three adder stages 100,102,104 separated by two pipeline registers 90,92,94. The first stage 80 of the adder-subtracter 14 produces results that serve as inputs for both the adder 16 and subsequent stages of the adder-subtracter 14.

Figure 11A:
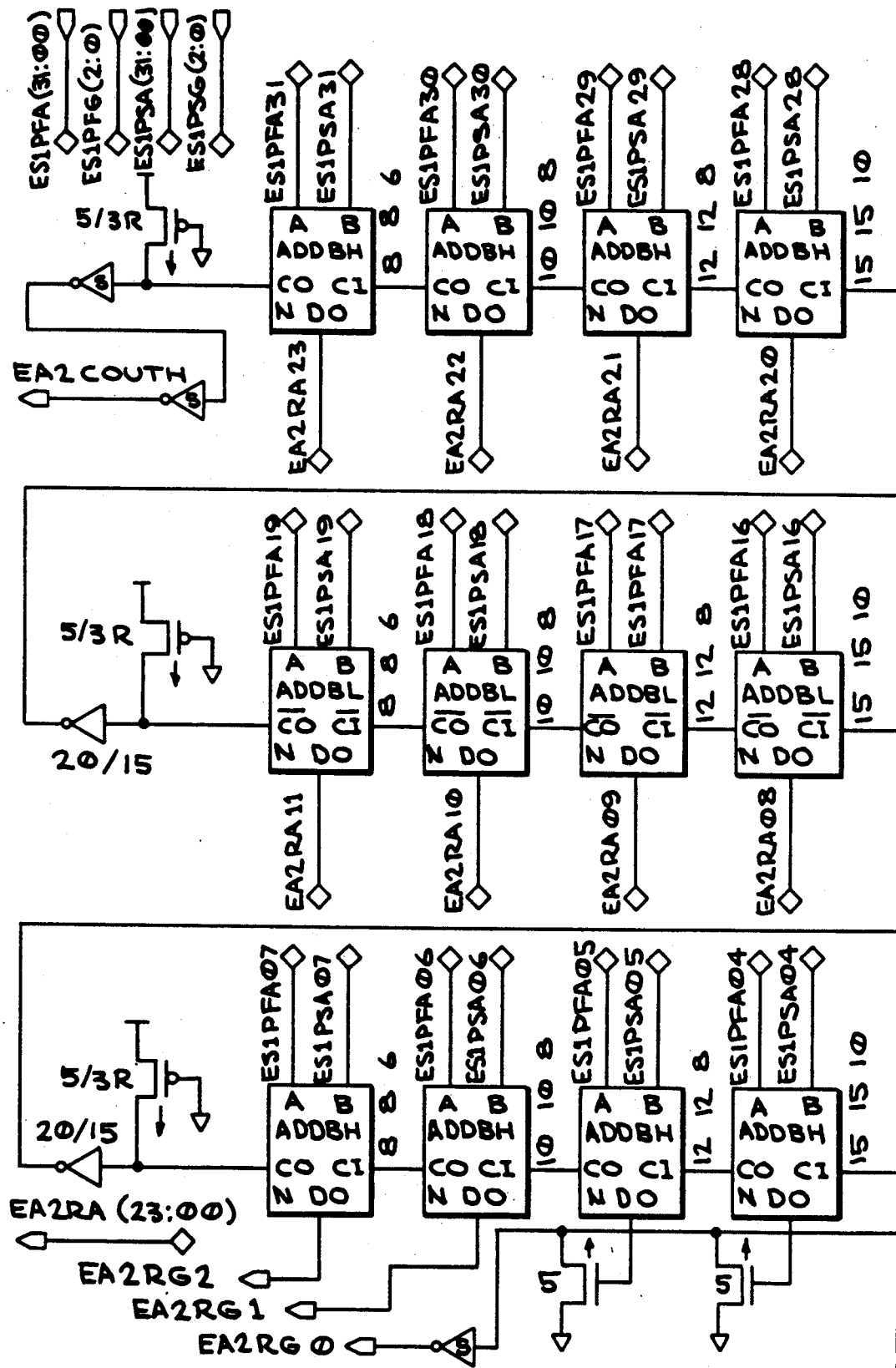
FIGS. 11A-11C are a detailed block diagram of the second stage of the adder.
Figure 11B:
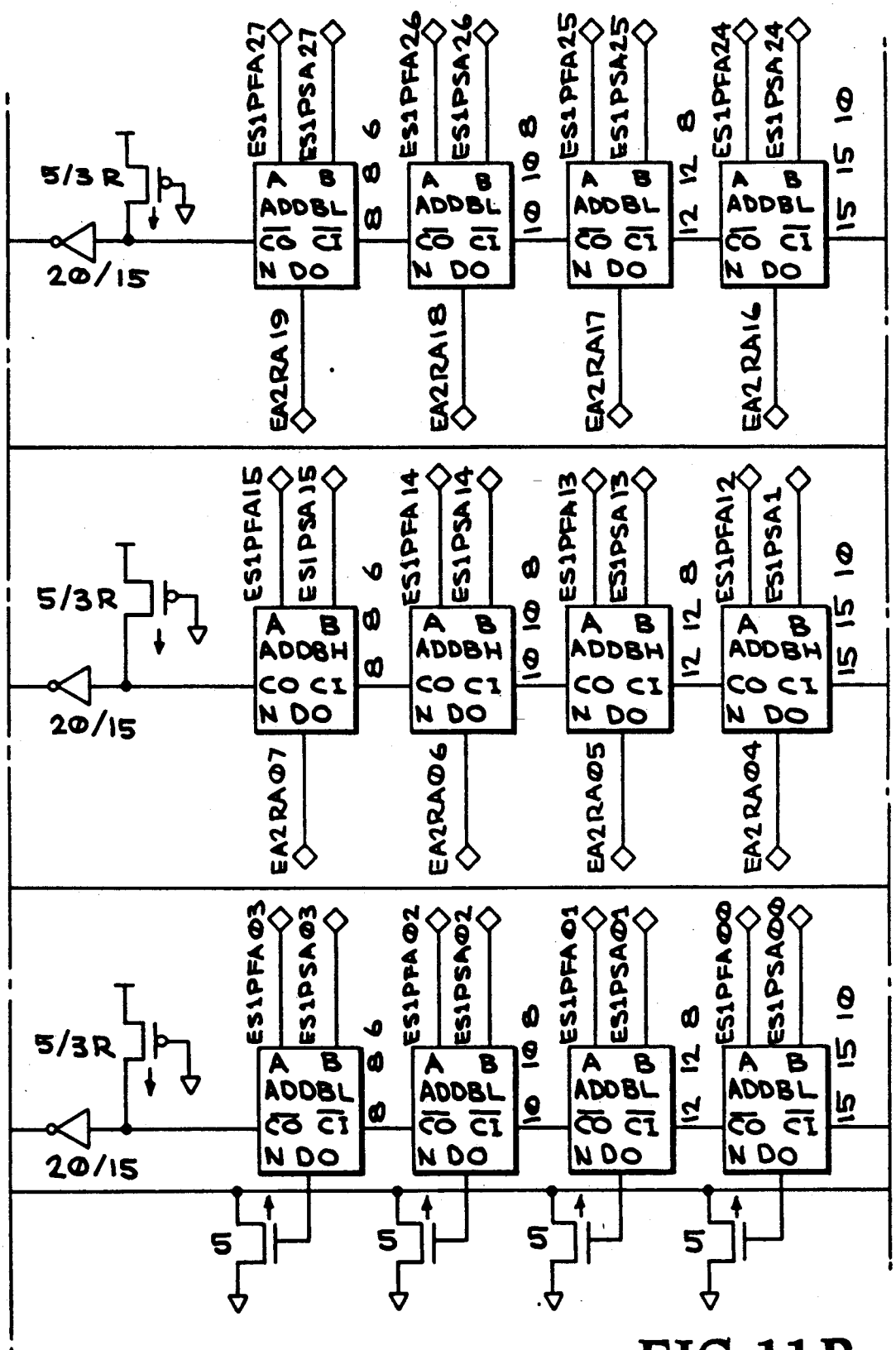
Figure 11C:
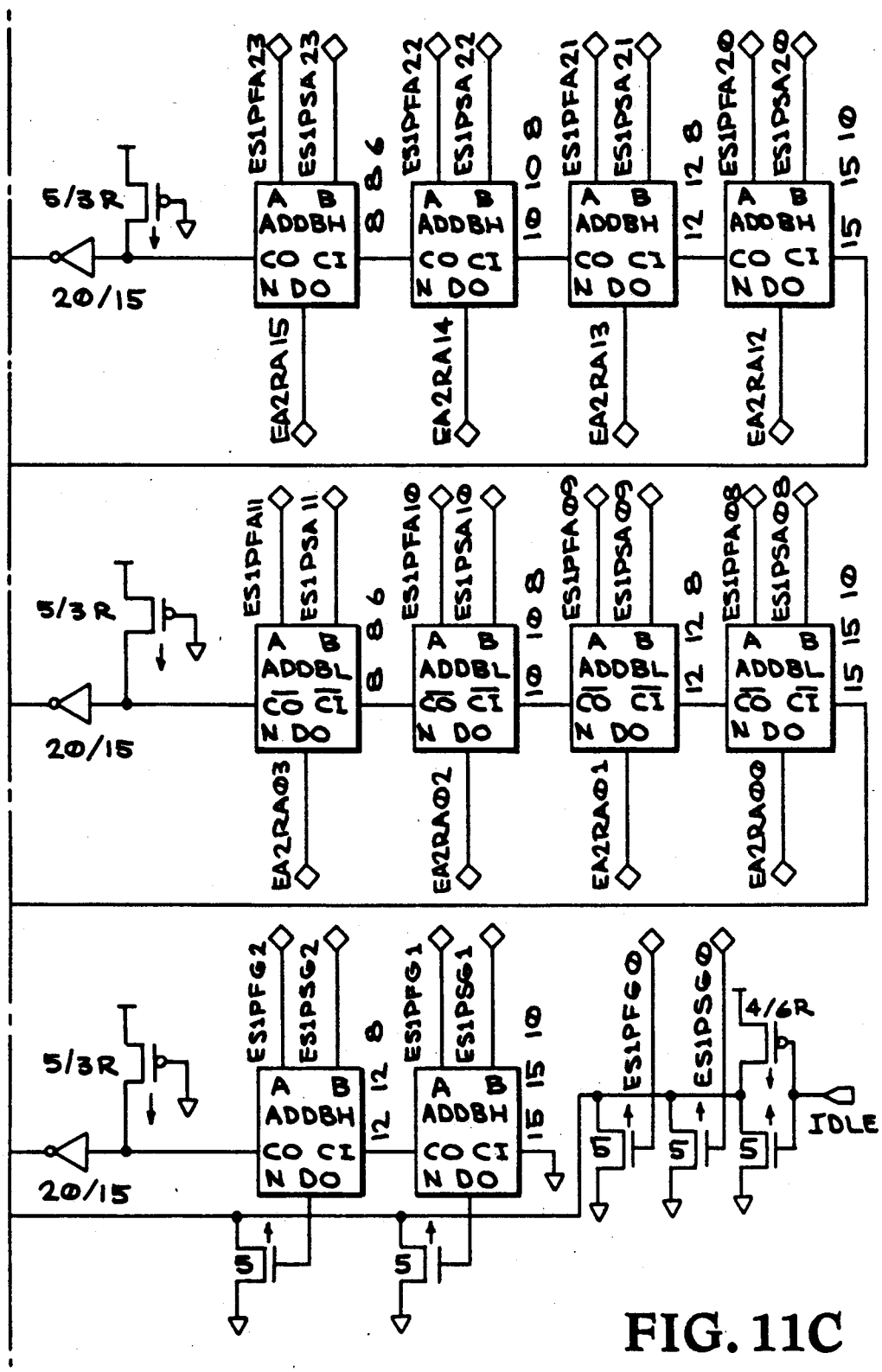

FIG. 11 shows a detailed diagram of the second stage 100 of the adder (EADD2). This stage is a 34-bit adder in which the exponent and the right fraction are turned into the 32-bit IEEE format and the sum is computed.

FIG. 12 shows a block diagram of the third stage 102 of the adder (EADD3). This block shifts right the fraction 1 position (if the adder generates carry), and determines whether the exponent has to be incremented.

The EANORMCON block 190 checks whether the exponent is 0 (denormalized operands) and the MSB is 1 (normalized result), or if carry (EA2PCOUTH) is active and activates EA3EXINCL (to increment the exponent).

The EAPOSTSHIFT block 192 is a 26-bit right shifter. If a shift is performed, a new sticky bit is computed.

Figure 13:
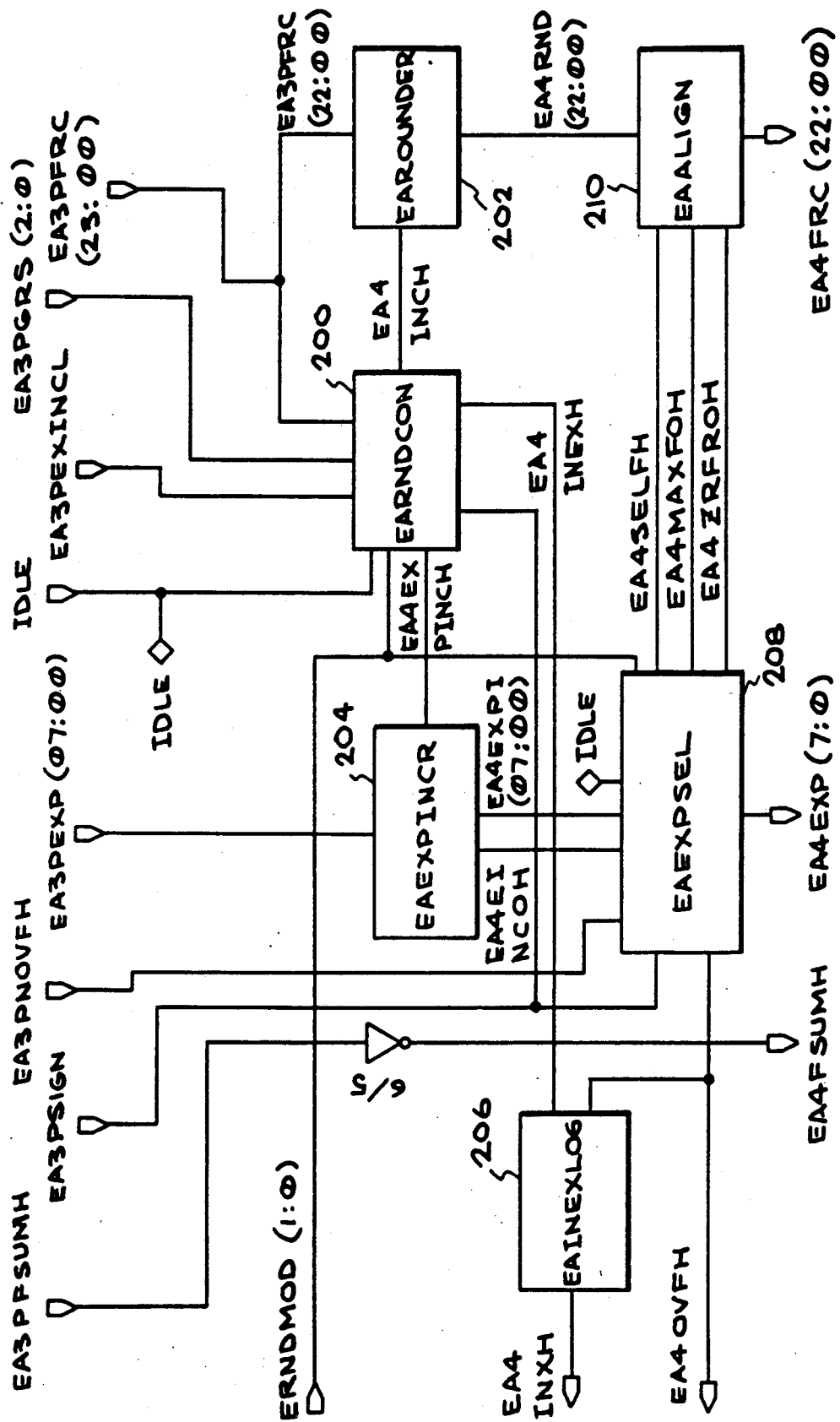

FIG. 13 shows a block diagram of the fourth stage 104 of the adder (EADD4). This stage rounds the 24-bit +3 guard bits fraction format into a standard 32-bit floating-point number (1-bit SIGNT, 8-bit exponent +23-bit fraction). Overflow is flagged and a standard result is generated if necessary.

The EARNDCON block 200, depending on rounding mode and fraction value, activates EA4INCH, which makes the ROUNDER increment the fraction. At the same time, an inexact result is signaled (EA4INEXH). An additional circuit determines whether the CARRY from the incrementer will be 1 and consequently the exponent must be incremented (EA4EXPINCH).

The ESROUNDER block 202 is a conditional-sum incrementer.

The EAEXPINCR block 204 is an 8-bit incrementer.

The EAINEXLOG block 206 generates an inexact flag EA4INXH if the result is rounded.

The EAEXPSEL block 208 detects overflow and generates a standard result, depending on the rounding mode (exponent=FFh and fraction=0 if EA4ZRFROH is activated, or exponent=FEH and fraction=7FFFFFH if EA4MAXFOH=1).

The ESALIGN block 210 is a 3-way multiplexer, the output of which can be: 1. ROUNDER output (EA4SELFH=1); 2. 7FFFFF(H) (EA4MAXFOH=1); 3. 000000 (EA4ZRFROH=1).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A vector arithmetic execution unit for a vector signal processor, comprising:
   a first data bus means (ERB) for transferring data signals and instruction signals between said arithmetic execution unit and storage units of the vector signal processor;
   a second data bus means (EDB) for transferring data between locations internal and external to said vector signal processor;
   pipelined floating-point multiplier means, coupled to said first and said second data buses, for multiplying two complex numbers together;
   pipelined floating-point adder-subtracter means, coupled to said first and said second buses, for adding or subtracting two complex numbers;
   auxiliary data register means, coupled to said first and said second data bus means, for storing input operands, output operands, and partial results for said multiplier means and for said adder-subtracter means;
   a read-only memory controlled by said execution unit,
   means coupling the output of said read-only memory to said auxiliary data register means, and
   control means for controlling data-flow in said vector arithmetic execution unit including initializing the pipeline operations of said multiplier means and of said adder-subtracter means; operating said multiplier means and said adder-subtracter, and combining partial results of said multiplier and said adder-subtracter into a final result.

2. The execution unit of claim 1 wherein the floating-point multiplier means includes a plurality of multiplier stages and a plurality of pipeline registers located between said multiplier stages for storing intermediate results of the multiplier units.

3. The execution unit of claim 2 wherein said pipelined floating-point multiplier means includes:
   a Y register for storing a first complex floating point input operand;
   a first multiplier stage having as inputs the output of said Y register and a second input operand, said first multiplier stage including
   means for operating on the sign, exponent, and mantissa of said inputs and for computing the sign of the final result;
   means for detecting exceptions including quiet, NaN, plus or minus infinity, zero, denormalized numbers;
   means for detecting if a requested operation is invalid and for setting corresponding flags;
   means for adding the exponents of said first and said second input operands;
   means for performing part of the multiplication of the unsigned mantissas of said first and of said second input operands by using a modified Booth algorithm with 3-bit encoding;
   means for transforming the partial products from the Booth algorithm into a sum and a carry array;

a first pipeline register for storing the output of said first multiplier unit;

a second multiplier stage including:
    means for completing the multiplication of the mantissas by adding together the sums and the carry arrays of the first multiplier stage; and
    means for determining the final exponent and number of shifts of the mantissa, left or right, as a function of the exponent computed in the first multiplier stage and the number of leading zeroes in the mantissa;

a second pipeline register for storing the output of said second multiplier unit;

a third multiplier stage including:
    means for shifting the mantissa right or left according to the number of shifts computed in the second multiplier stage;
    means for incrementing the mantissa and the exponent if necessary;
    means for detecting overflow, underflow, and an inexact result.

4. A vector arithmetic execution unit for a vector signal processor, comprising:

a first data bus means (ERB) for transferring data signals and instruction signals between said arithmetic execution unit and storage units of the vector signal processor;

a second data bus means (EDB) for transferring data between locations internal and external to said vector signal processor;

pipelined floating-point multiplier means, coupled to said first and said second data buses, for multiplying two complex numbers together;

pipelined floating-point adder-subtracter means, coupled to said first and second buses, for adding or subtracting two complex numbers;

said pipelined floating-point adder-subtracter means including a plurality of adder-subtracter stages and a plurality of pipeline registers located between said adder-subtracter stages for storing intermediate results of the adder-subtracter units including:

a first adder-subtracter stage including:
    means for preparing input operands for a predetermined arithmetic operation;
    means for determining the predetermined arithmetic operation to be carried out on said input operands;
    means for detecting and flagging exceptions to a predetermined arithmetic standard;

a first pipeline register for storing the outputs of the first adder-subtracter stage;

a second adder-subtracter stage including:
    means for carrying out the predetermined arithmetic operation on said input operands;
    means for determining the sign of the result of said predetermined arithmetic operation;

a second pipeline register for storing the outputs of the second adder-subtracter stage;

a third adder-subtracter stage including:
    means for normalizing the output of the second adder-subtracter to the predetermined arithmetic standard;

a third pipeline register for storing the outputs of the third adder-subtracter stage;

a fourth adder-subtracter stage including:
    means for rounding an extended-format result of the third adder-subtracter into a standard floating-point number; and
    means for flagging overflow and for generating a standard result in response thereto;

auxiliary data register means, coupled to said first and said second data bus means, for storing input operands, output operands, and partial results for said multiplier means and for said adder-subtracter means;

control means for controlling data-flow in said vector arithmetic execution unit, said control means including:
    means for initializing the pipeline operations of said multiplier means and of said adder-subtracter means;
    means for operating said multiplier means and said adder-subtracter;
    means for combining partial results of said multiplier and said adder-subtracter into a final result.

5. The execution unit of claim 4 including a pipe-lined floating-point adder means for adding two operands, said adder having its input connected to the output of the first pipeline register of the floating-point adder-subtracter, said pipelined floating-point adder including:
    means for converting the exponent and the mantissa of the input operands to a predetermined arithmetic standard; and
    means for carrying out an addition operation on the input operands;

a first pipeline register for storing the outputs of the first adder stage;

a second adder stage including:
    means for normalizing the output of the first adder stage to the predetermined arithmetic standard;

a second pipeline register for storing the outputs of the second adder stage;

a third adder stage including;
    means for rounding an extended format result of the second adder stage into a standard floating-point number; and
    means for flagging overflow and for generating a standard result in response thereto.

6. The execution unit of claim 5 wherein the adder means and the adder-subtracter means simultaneously compute sum and difference signals for said input operands.

* * * * *